(12) United States Patent
Conover et al.

(10) Patent No.: US 7,296,138 B1
(45) Date of Patent: Nov. 13, 2007

(54) METHOD AND APPARATUS TO HOOK SHARED LIBRARIES ACROSS ALL PROCESSES ON WINDOWS

(75) Inventors: Matthew Conover, Mountain View, CA (US); Sourabh Satish, Mountain View, CA (US)

(73) Assignee: Symantec Corporation, Cupertino, CA (US)

( * ) Notice: Subject to any disclaimer, the term of this patent is extended or adjusted under 35 U.S.C. 154(b) by 345 days.

(21) Appl. No.: 11/075,515

(22) Filed: Mar. 8, 2005

(51) Int. Cl.
*G06F 12/00* (2006.01)
*G06F 9/34* (2006.01)
(52) U.S. Cl. ...................... 711/206; 711/203
(58) Field of Classification Search ............... None
See application file for complete search history.

(56) References Cited

OTHER PUBLICATIONS

Kath, Randy, "*The Virtual-Memory Manager in Windows NT*", Microsoft Corporation, Dec. 21, 1992, pp. 1-11 [online]. Retrieved from the Internet: <URL:http://www.msdn.microsoft.com/library/defalt.asp?url=/library/en-us/dngenlib/html/msdn_ntvmm.asp>.
Russinovich, Mark, "*Inside Memory Management, Part 1*", WindowsITPro, Aug. 1998, pp. 1-10 [online]. Retrieved from the Internet: <URL:http://www.windowsitpro.com/Articles/Print.cfm?ArticleID=3686>.
Russinovich, Mark, "*Inside Memory Management, Part 2*", WindowsITPro, Sep. 1998, pp. 1-4 [online]. Retrieved from the Internet: <URL:http://www.windowsitpro.com/Articles/Print.cfm?ArticleID=3774>.
Solomon, David A. and Russinovich, Mark E., "*Inside Microsoft Windows 2000*", 3rd. Edition, Microsoft Press, 2000, pp. 446-448.

*Primary Examiner*—Reginald Bragdon
*Assistant Examiner*—Thanh D Vo
(74) *Attorney, Agent, or Firm*—Gunnison, McKay & Hodgson, L.L.P.; Lisa A. Norris

(57) ABSTRACT

A process page table entry (PTE) associated with a process is located, and a determination is made whether the process PTE is prototype PTE. If the process PTE is a prototype PTE, the location of the actual PTE is determined. A copy-on-write functionality associated with the PTE is disabled and the location of shared page of memory associated with the PTE determined. The shared page is modified, for example with hooking code, and the copy-on-write functionality is re-enabled.

17 Claims, 4 Drawing Sheets

METHOD AND APPARATUS TO HOOK SHARED LIBRARIES ACROSS ALL PROCESSES ON WINDOWS

BACKGROUND OF THE INVENTION

1. Field of the Invention

The present invention relates to processes on computer systems. More particularly, the present invention relates to modification of pages in shared memory on Windows® operating systems.

2. Description of Related Art

Software products, such as host-based intrusion detection systems (HIDS) products, frequently need to make changes to sections of memory shared by multiple processes, for example, to modify dynamically linked libraries (DLLs). When the sections of memory needing the changes cannot be mapped as shared for write, conventionally, each process address space within the section of memory is modified separately.

SUMMARY OF THE INVENTION

In accordance with one embodiment, a method includes determining the location of a process page table entry (PTE) associated with a shared page of memory, the shared page of memory to be modified. A determination is made whether the process page table entry is a prototype PTE (PPTE). If the process page table entry is a prototype PTE, the location of the PTE (i.e., actual PTE) is determined. A copy-on-write attribute in the PTE is disabled, and the location of the shared page of memory is determined. The shared page is modified, for example with hooking code, and the copy-on-write attribute is re-enabled in the PTE.

Embodiments in accordance with the invention permit an application to effect a change to a page of memory shared by several processes on a Windows operating system so that it is not necessary to make the change for each process and without incurring the generation of multiple copies of the shared page for each process. In particular, the copy-on-write attribute located in the PTE associated with the shared page in memory is temporarily disabled to allow the shared page of memory to be modified, such as with hooking code, and then the copy-on-write functionality is re-enabled.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
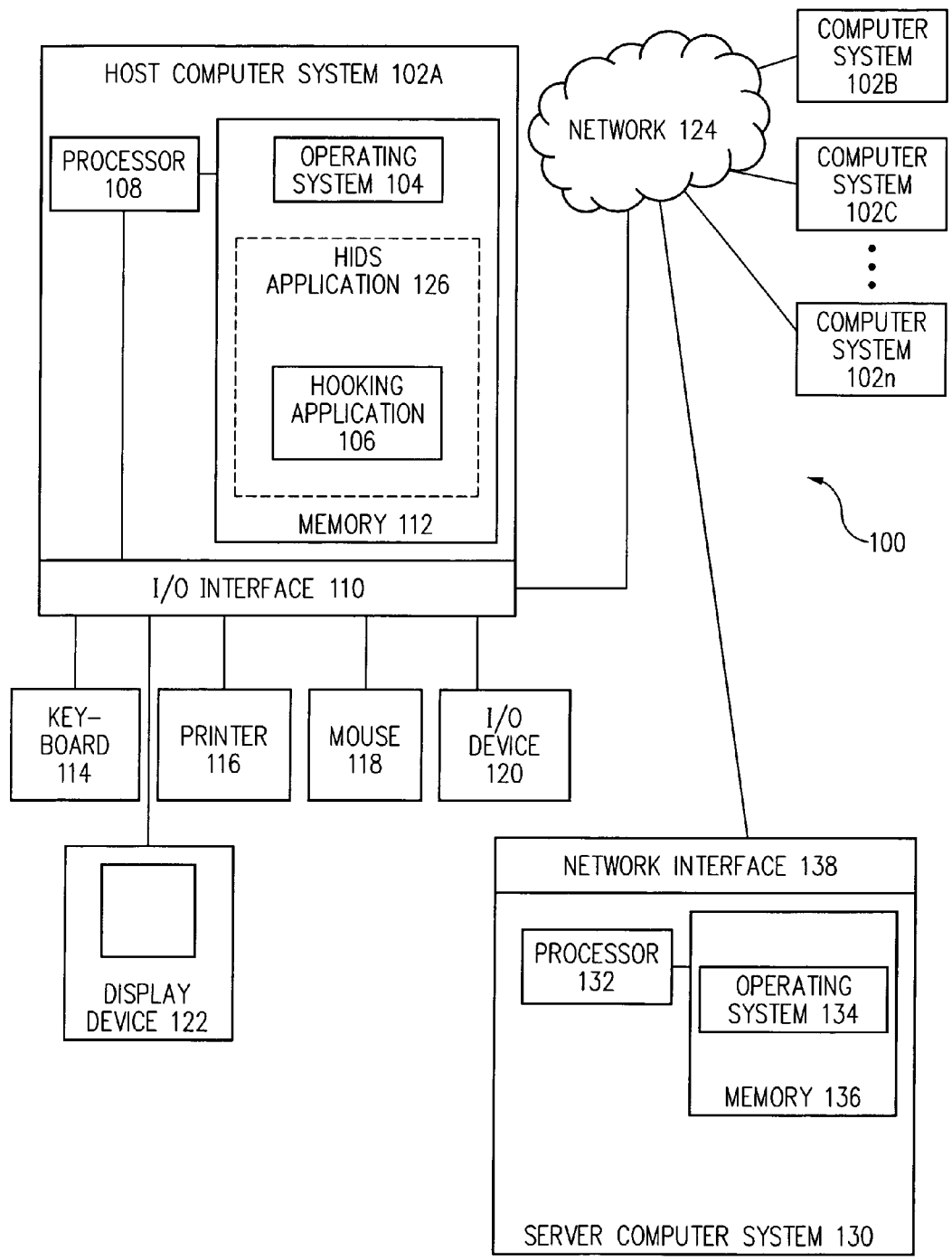
FIG. 1 is a diagram of a client-server system that includes a hooking application executing on a host computer system in accordance with one embodiment of the present invention.

Windows® operating systems, such as Windows® NT and Windows® 2000, are widely used on home and business computer systems. Windows® NT and Windows® 2000 are 32-bit operating systems that provide page-based virtual memory management schemes that permit applications to realize a 4 GB (gigabyte) virtual memory address space. When the computer system processor is running in virtual memory mode, all addresses are assumed to be virtual addresses and are translated, or mapped, to physical addresses in main memory each time the processor executes a new instruction to access memory.

Conventionally, a 32-bit virtual address is divided into page offsets that are used for translating the virtual address into a physical location in memory. The higher order 10 bits of the virtual address, sometimes termed the page directory index, represent a first offset from a base address in a page of memory called the page directory and identify the location of a 32-bit page directory entry (PDE). The PDE identifies a particular page in memory termed a Page Table.

The next 10 bits, sometimes termed the page table index, represent a second offset from a base address in the selected page table and identify the location of a 32-bit page table entry (PTE). A PTE identifies the location of a page of memory termed a page frame at a particular page frame number (PFN). Together with identifying the location of a page in memory, a PTE also identifies the protection(s) (e.g., attributes) of the page, the backing page file of the page, and the state of the page. A page table entry (PTE) is used to provide access to the physical page of memory, and Windows® (hereinafter simply Windows) operating systems control the use of the page in memory using the attributes found in the PTE.

The remaining 12-bits, sometimes termed the page byte offset, represent a third offset from a base address in the selected page frame and identify a specific byte of memory in the page frame.

Typically, a PTE is 32 bits wide in which the values of the first 5 bits designate the page protection(s) (e.g., attributes) for the page of memory, for example, whether a page can be written to, or read from, and whether code can be executed in the page. The values of the following 20 bits represent the physical address of the page in memory (if resident). If the page of memory is paged to disk, the values of the 20 bits are used as an offset into an associated page file to locate the page. The values of the next 4 bits indicate which page file backs the page of memory, and the values of the final 3 bits indicate the state of the page in memory.

In order to allow different processes to use the same page in memory (i.e., to share memory), the Windows operating system utilizes a variation of file mapping termed memory mapping in which the Windows operating system backs views of the shared page with a paging file. The Windows operating system designates shared pages of memory as copy-on-write such that when a change is to be made to a shared page of memory, a copy of the shared page is generated (for the process making the change) and the change is made to the copy of the page (also termed herein copy-on-write functionality). This permits one process to use the same data as another process but a copy of the changed page is retained by the process making the change and is not seen by the other process. Conventionally, these page protection attributes are represented as bit values stored in the PTE associated with the shared page.

In Windows operating systems, when a page in memory is to be shared by several processes, each process utilizes a prototype PTE (PPTE) rather than the PTE, herein also termed the actual PTE. The prototype PTE points to the actual PTE that in turn points to the shared page in memory. While the PTE contains the page protection attribute for copy-on-write functionality, the prototype PTE does not.

A prototype PTE is marked as invalid for access by the processor, thus it is not recognized by the processor. When a process attempts to access a prototype PTE, the processor raises a page fault exception. When the exception is raised, the page fault handler of the Windows operating system interprets the prototype PTE and directs the access to the actual PTE.

In some applications, such as host intrusion detection system (HIDS) applications, several processes need to make the same change to a shared page in memory, such as a shared library. As described above, the modification of a shared page in memory results in each process being allocated a copy of the changed page resulting in multiple copies of the changed page.

Embodiments in accordance with the invention permit an application to change a page of memory shared by several processes on a Windows operating system so that it is not necessary to make the change for each process and without incurring the generation of multiple copies of the changed page for each process. In particular, the copy-on-write attribute located in the PTE associated with the shared page of memory is temporarily disabled to allow the page of shared memory to be modified, such as with hooking code, and then the copy-on-write functionality is re-enabled. Thus, utilizing embodiments in accordance with the invention, an application, such as a host-based intrusion detection system (HIDS) application, can hook all the processes in a shared section of memory, such as a shared library, without having to separately effect the change for each process.

Figure 2:
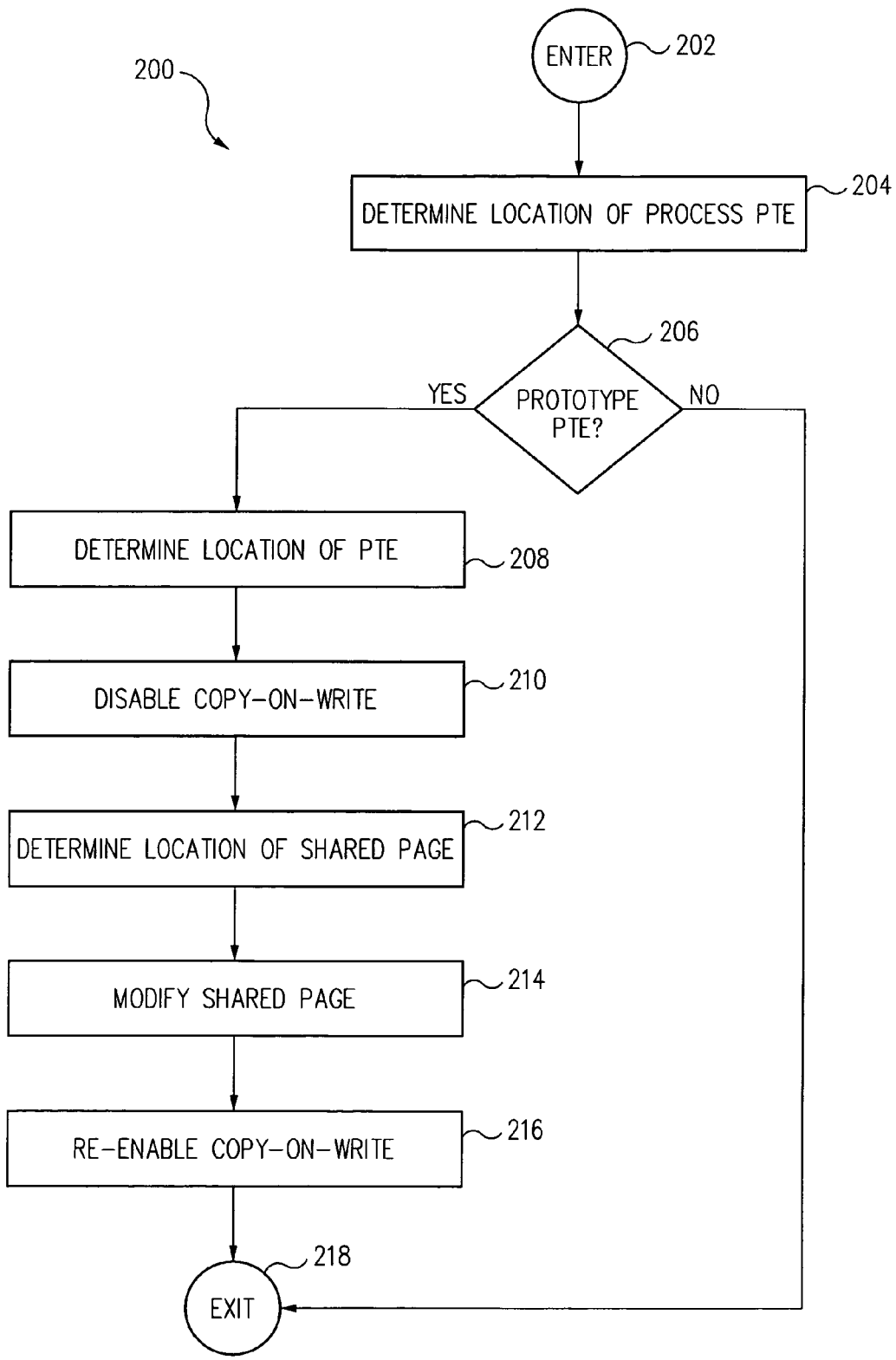
FIG. 2 illustrates a flow diagram of a method implemented by the hooking application of FIG. 1 in accordance with one embodiment of the invention.

Referring generally to FIG. 2, in accordance with one embodiment of the invention, a method 200 includes determining the location of a process PTE associated with a process to be modified (operation 204). A determination is made whether the process PTE is a prototype PTE (operation 206). If the process PTE is a prototype PTE ("YES"), the location of the actual PTE is determined (operation 208). The copy-on-write functionality in the actual PTE is disabled (operation 210) and the location of a shared page in physical memory associated with the actual PTE is determined (operation 212). The shared page is modified (operation 214), for example, the code of the shared page in physical memory is modified with hooking code, and the copy-on-write functionality in the actual PTE is re-enabled (operation 216).

FIG. 1 is a diagram of a client-server system 100 that includes a hooking application 106 executing on a host computer system 102A in accordance with one embodiment of the present invention. Host computer system 102A, can be a stand-alone computer system, such as a personal computer or workstation, as illustrated in FIG. 1. Host computer system 102A (e.g., a first computer system) can also be part of a client-server configuration that is also illustrated in FIG. 1 in which host computer system 102A interacts with a server computer system 130 (e.g., a second computer system) via a network 124. Network 124 can be any network or network system that is of interest to a user, for example, the Internet.

Hooking application 106 is described herein as executed on host computer system 102A, however, in light of this disclosure, those of skill in the art can understand that the description is applicable to a client-server system as well. Host computer system 102A typically includes a central processing unit (CPU) 108, hereinafter processor 108, an input/output (I/O) interface 110, an operating system 104, such as Windows operating system, and a memory 112.

Host computer system 102A may further include standard devices, such as a keyboard 114, a mouse 118, a printer 116, and a display device 122, as well as, one or more standard input/output (I/O) devices 120, such as a compact disk (CD) or DVD drive, floppy disk drive, or other digital or waveform port for inputting data to and outputting data from host computer system 102A. In one embodiment, memory 112 includes a main memory, as well as any supplemental memories, and includes executable areas, data storage areas, and any memory areas needed by host computer system 102.

In one embodiment, hooking application 106 is loaded into host computer system 102 via I/O device 120, such as from a CD, DVD or floppy disk containing hooking application 106. In some embodiments, hooking application 106 can be part of another application, such as host intrusion detection system (HIDS) application 126. In other embodiments, such as client-server embodiments, hooking application 106 can be downloaded into host computer system 102A from server computer system 130 via network 124. Server computer system 130 can further include: a network interface 138 for communicating with network 124; a memory 136; a processor 132; and an operating system 134. In various embodiments, network interface 138 and I/O interface 110 include analog modems, digital modems, or a network interface card.

In FIG. 1, host computer system 102 is also coupled to computer system 102B-102n by network 124. In one embodiment, computer systems 102B-102n are similar to host computer system 102A, for example, includes a central processing unit, an input/output (I/O) interface and a memory. Computer systems 102B-102n may further include standard devices like a keyboard, a mouse, a printer, a display device, and an I/O device(s). The various hardware components of computer systems 102B-102n are not illustrated to avoid detracting from the principles of the invention.

In the present embodiment, hooking application 106 is stored in memory 112 of host computer system 102A and executed on host computer system 102A. The particular type and configuration of host computer system 102A, server computer system 130, and computer systems 102B-102n are not essential to this embodiment of the present invention.

FIG. 2 illustrates a flow diagram of a method 200 implemented by hooking application 106 (FIG. 1) in accordance with one embodiment of the invention. In various embodiments, hooking application 106 (including method 200) can be implemented independently or as part of a host-based intrusion detection system (HIDS) application, for example, HIDS application 126 (FIG. 1). For purposes of description, hooking application 106 is described herein as independently implemented on host computer system 102A in which operating system 104 is a Windows operating system, such as Windows® NT or Windows® 2000. Herein a shared page is a page of memory that can be shared by more than one process and contains code. Referring now to FIGS. 1 and 2 together, execution of hooking application 106 by processor 108 results in the operations of host computer method 200 as described below in one embodiment.

In the present embodiment, hooking application 106 is loaded as a user mode application into memory 112 of host computer system 102A. For purposes of description, assume hooking application 106 is to hook a process located in the shared library kernel 32 and loads kernel 32. When hooking application 106 loads kernel 32 it receives a process page table entry (PTE) located in a page table. Herein the term "process PTE" is used to generally indicate the entry located in the page table. At this point in method 200, it has not been determined whether the entry in the page table is a prototype PTE or an actual PTE. Method 200 is entered at an ENTER operation 202, and from ENTER operation 202, processing transitions to a DETERMINE LOCATION OF PROCESS PTE operation 204.

In DETERMINE LOCATION OF PROCESS PTE operation 204, hooking application 106 determines the location of its own process PTE. In one embodiment, hooking application 106 references directory structures stored in its process data structure and determines the virtual address of its process PTE. For example, in one embodiment, hooking application 106 utilizes the page table index to provide the location of the PTE in a page table. The lookup of a PTE (e.g., the process PTE) in a page table is well known to those of skill in the art and is not further described herein to avoid detracting from the principles of the invention. From DETERMINE LOCATION OF PROCESS PTE operation 204, processing transitions to a PROTOTYPE PTE check operation 206.

In PROTOTYPE PTE check operation 206, a determination is made whether the process PTE is a prototype PTE (PPTE). In one embodiment, the values of bit 0 and bit 10 of the process PTE are read to determine whether the process PTE is a prototype PTE. In particular, a determination is made whether the value of bit 0 is cleared (e.g., has a value of zero) and the value of bit 10 is set (e.g., has a value of one). If the value of bit 0 is cleared and the value of bit 10 is set, the process PTE is determined to be a prototype PTE, otherwise the process PTE is determined not to be a prototype PTE.

The following is an example of a bit assignment in a prototype PTE:

| Bit 0: | Valid = 0 (1 bit) |
| Bits 1-7: | PrototypeAddressLow7Bits (7 bits) |
| Bit 8: | ReadOnly (1 bit) |
| Bit 9: | WhichPool (1 bit) |
| Bit 10: | Prototype = 1 (1 bit) |
| Bits 11-31: | PrototypeAddressHigh21bits (21 bits). |

In the above example, the value of bit 0 is cleared (e.g., is equal to zero) and the value of bit 10 is set to one (1) indicating the process PTE entry is a prototype PTE (PPTE). An example of one embodiment of a method for determining whether a process PTE is a prototype PTE is further described herein with reference to a method 300 and FIG. 3.

Figure 3:
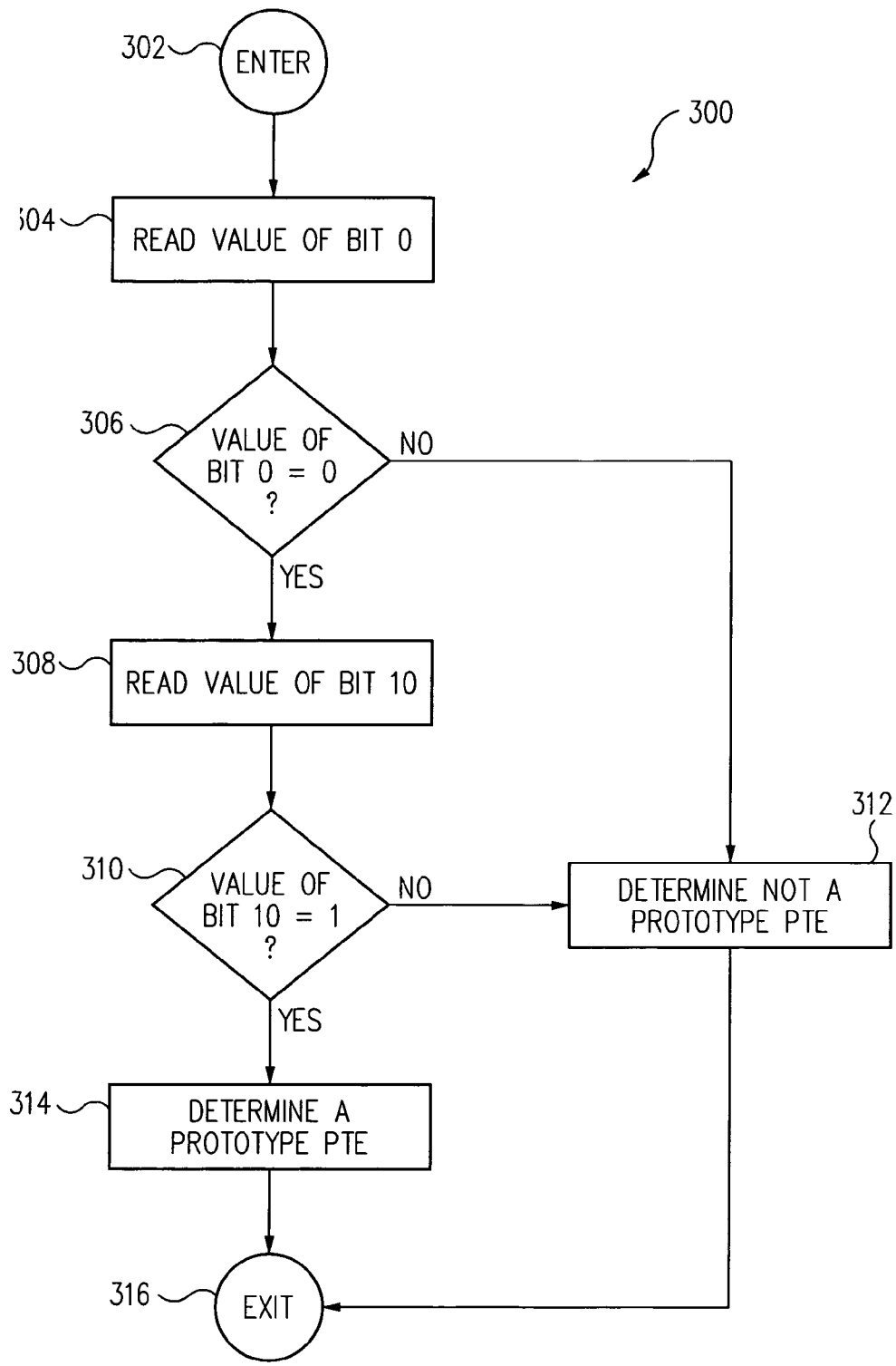
FIG. 3 illustrates a flow diagram of a method implemented by the hooking application of FIG. 1 for determining whether a process PTE is a prototype PTE in accordance with one embodiment of the invention.

FIG. 3 illustrates a flow diagram of a method 300 implemented by hooking application 106 for determining whether a process PTE is a prototype PTE in PROTOTYPE PTE check operation 206 of FIG. 2 in accordance with one embodiment of the invention. Referring now to FIGS. 2 and 3 together, in one embodiment, method 300 is entered from DETERMINE LOCATION OF PROCESS PTE operation 204 of method 200 at an ENTER operation 302. From ENTER operation 302, processing transitions to a READ VALUE OF BIT 0 operation 304.

In READ VALUE OF BIT 0 operation 304, the value of bit 0 of the process PTE is read, and processing transitions from READ VALUE OF BIT 0 operation 304, to a VALUE OF BIT 0=0 check operation 306.

In VALUE OF BIT 0=0 check operation 306, a determination is made whether the value of bit 0 is equal to zero (0) (e.g., is cleared). In one embodiment, if the value of bit 0 is not equal to zero (0) (e.g., is equal to one (1)) ("NO"), the process PTE is not a prototype PTE, and from VALUE OF BIT 0=0 check operation 306, processing transitions to a DETERMINE NOT A PROTOTYPE PTE operation 312.

In DETERMINE NOT A PROTOTYPE PTE operation 312, the process PTE is determined not to be a prototype PTE, and from DETERMINE NOT A PROTOTYPE PTE operation 312, processing transitions to an operation 316, with processing exiting method 300 and returning to operation 206 of method 200.

Referring again to VALUE OF BIT 0=0 check operation 306, alternatively, if the value of bit 0 is equal to zero (0) (e.g., bit 0 is cleared) ("YES"), processing transitions from VALUE OF BIT 0=0 check operation 306 to a READ VALUE OF BIT 10 operation 308.

In READ VALUE OF BIT 10 operation 308, the value of bit 10 of the process PTE is read, and processing transitions from READ VALUE OF BIT 10 operation 308, to a VALUE OF BIT 10=1 check operation 310.

In VALUE OF BIT 10=1 check operation 310, a determination is made whether the value of bit 10 is equal to one (1) (e.g., is set). In one embodiment, if the value of bit 10 is not equal to one (1) (e.g., is equal to zero (0)) ("NO"), the process PTE is determined not to be a prototype PTE, and from VALUE OF BIT 10=1 check operation 310, processing transitions to DETERMINE NOT A PROTOTYPE PTE operation 312, as earlier described.

Alternatively, if the value of bit 10 is equal to one (1) (e.g., the value of bit 10 is set) ("YES"), the process PTE is a prototype PTE, and from VALUE OF BIT 10=1 check operation 310, processing transitions to a DETERMINE A PROTOTYPE PTE operation 314.

In DETERMINE A PROTOTYPE PTE operation 314, the process PTE is determined to be a prototype PTE (PPTE), and from DETERMINE A PROTOTYPE PTE operation 314, processing transitions to operation 316 with processing exiting method 300 and returning to operation 206 of method 200.

As can be appreciated by those of skill in the art, FIG. 3 and method 300 illustrate one embodiment for determining whether a process PTE is a prototype PTE and other embodiments can also be used. For example, in other embodiments, the order of checking the values of bit 0 and bit 10 can be reversed or performed in parallel.

Referring again to FIG. 2 and PROTOTYPE PTE check operation 206, if the process PTE is not a prototype PTE, (e.g., is the actual PTE)("NO"), a page associated with the process PTE is not a shared page and there is no need to disable a copy-on write functionality, and from PROTOTYPE PTE check operation 206, processing transitions to an EXIT operation 218, with processing exiting method 200.

Alternatively, if the process PTE is a prototype PTE ("YES"), a page associated with the prototype PTE is a shared page. However, the copy-on-write attribute is not available in the prototype PTE, but is available in the actual PTE, and processing transitions from PROTOTYPE PTE check operation 206 to a DETERMINE LOCATION OF PTE operation 208.

In DETERMINE LOCATION OF PTE operation 208, the location of the actual PTE associated with the prototype PTE is determined. In one embodiment, the location of the actual PTE is determined by ORing the high values (values of bits 11-31) and low values (values of bits 1-7) of the prototype PTE. The resulting OR'd value, also termed herein the offset value, provides an offset relative to a base address of 0xE1000000 (in Windows) and is the location of the actual PTE. From DETERMINE LOCATION OF PTE operation 208, processing transitions to a DISABLE COPY-ON-WRITE operation 210.

In DISABLE COPY-ON-WRITE operation 210, the copy-on-write functionality is disabled. In one embodiment, the copy-on-write attribute maintained in the PTE is modified to disable the copy-on-write functionality. In particular, in one embodiment, the value at bit 9 in the actual PTE is modified from 1 to 0 (e.g., the copy-on-write bit is cleared). This disables the copy-on-write functionality and the generation of duplicate copies when a change is made to the associated shared page. From DISABLE COPY-ON-WRITE operation 210, processing transitions to a DETERMINE LOCATION OF SHARED PAGE operation 212.

In DETERMINE LOCATION OF SHARED PAGE operation 212, the location of a shared page in memory is determined. In one embodiment, the location of a shared page in physical memory is determined from the actual PTE. For example, the 20 bits following the 5 page protection bits in the PTE include values that represent the offset of the shared page relative to the base address of physical memory, and thus the location of the shared page. From DETERMINE LOCATION OF SHARED PAGE operation 212, processing transitions to a MODIFY SHARED PAGE operation 214.

In MODIFY SHARED PAGE operation 214, the shared page is modified in physical memory. In one embodiment, the code of the shared page is modified to include hooking code. As is well known to those of skill in the art, hooking code allows a process to intercept calls to or the invocation of a function on a program wide or operating system wide basis prior to execution. From MODIFY SHARED PAGE operation 214, processing transitions to a RE-ENABLE COPY-ON-WRITE operation 216.

In RE-ENABLE COPY-ON-WRITE operation 216, the copy-on-write functionality is re-enabled. In one embodiment, the copy-on-write attribute maintained in the PTE is modified to re-enable the copy-on-write functionality. In particular, in one embodiment, the value of bit 9 in the actual PTE is modified from 0 to 1 (e.g., the copy-on-write bit is set). This re-enables the copy-on-write functionality and generation of duplicate copies when a change is made to the associated shared page. From RE-ENABLE COPY-ON-WRITE operation 216, processing transitions to EXIT operation 218, with processing exiting process 200.

Figure 4:
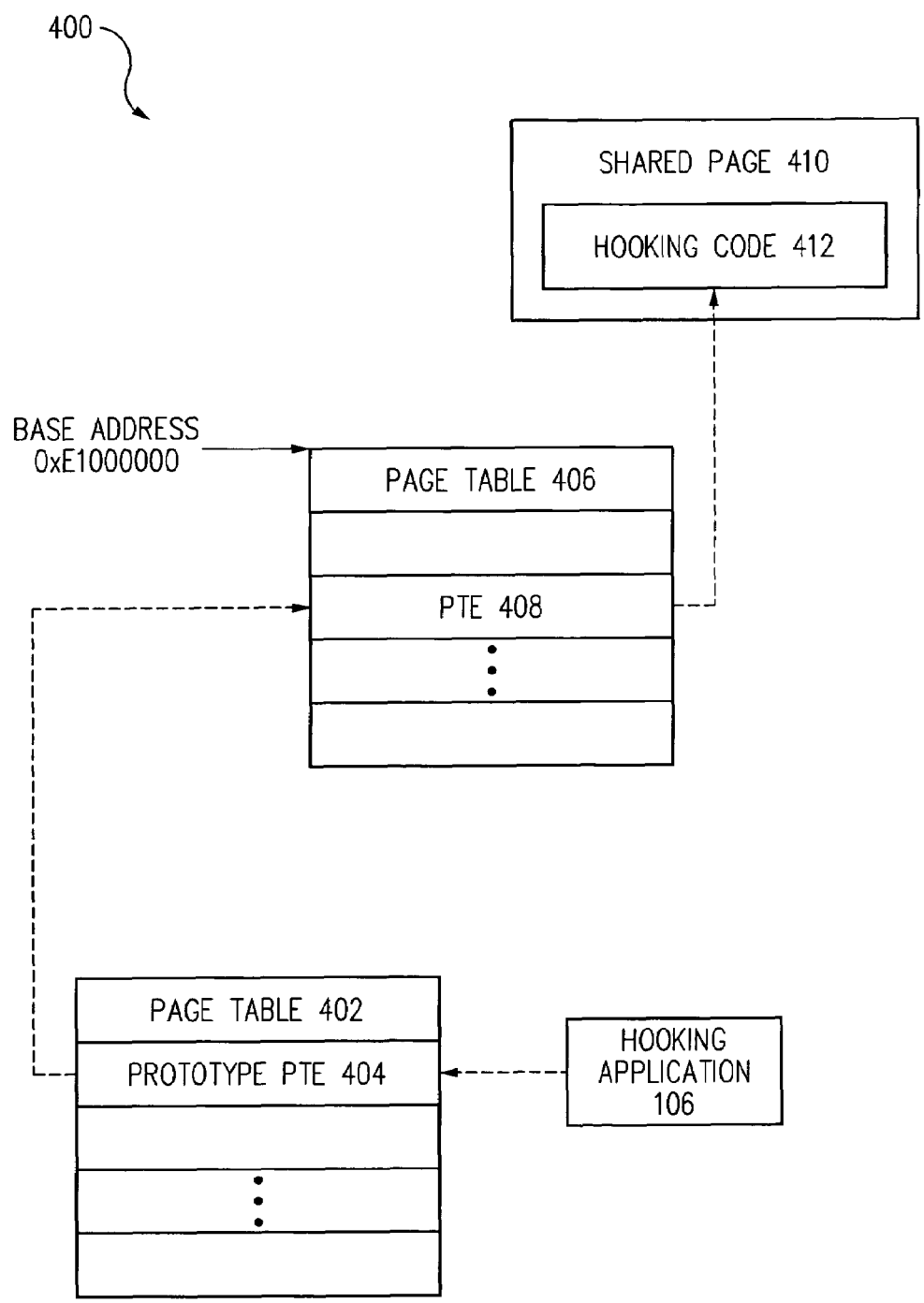
FIG. 4 is a block diagram illustrating installation of hooking code into a shared page of memory in accordance with one embodiment of the invention.

FIG. 4 is a block diagram 400 illustrating installation of hooking code 412 into a shared page 410 of memory utilizing method 200 in accordance with one embodiment of the invention. Referring now to FIGS. 1, 2, and 4, in one embodiment, hooking application 106 determines the location of a process PTE, illustrated as prototype PTE 404 in a page table 402 on host computer system 102A (operations 202-204). The values of bits 0 and 10 of the process PTE (i.e., prototype PTE 304) are checked and a determination is made that the value of bit zero is set to zero (0) and the value of bit 10 is set to one (1) indicating that process PTE (i.e., prototype PTE 404) is a prototype PTE (operation 206).

The values of bits 1-7 (also termed herein the low values) and the values of bits 11-31 (also termed herein the high values) of prototype PTE 404 are OR'd together to provide the location of the actual PTE 408 (operation 208). As earlier described, the resulting OR'd value (i.e., the offset value) is an offset relative to a base address of 0xE1000000 at which PTE 408 is located in a page table 406. PTE 408 is located and the copy-on-write attribute in PTE 408 is modified to temporarily disable the copy-on-write functionality (operation 210).

The location of shared page 410 is determined (operation 212) from PTE 408. Shared page 410 is located in physical memory, and the code in shared page 410 is modified to include hooking code 412 (operation 214). The copy-on-write attribute in PTE 408 is modified to re-enable the copy-on-write functionality (operation 216), and method 200 is exited. Processes afterward accessing shared page 410 view hooking code 412 included in shared page 410.

Although hooking application 106 (and method 200) is described herein as implemented in user mode, in another embodiment, hooking application 106 is implemented in kernel mode. In this alternative embodiment, hooking application 106 is loaded as a kernel mode application, such as a kernel mode driver. Hooking application 106 registers itself with operating system 104 (e.g., the Windows operating system) to receive a notification when a shared library, or other shared memory module, is created, but before it is utilized. When the notification is generated a stall occurs, and method 200 is entered. As is well-known to those of skill in the art, in kernel mode, addresses are the physical addresses rather than the virtual addresses utilized in user mode.

Thus, in accordance with the invention, the location of a process PTE is determined. A determination is made whether the process PTE is prototype PTE. If the process PTE is a prototype PTE, the location of the actual PTE is determined. The copy-on-write attribute in the actual PTE is modified to disable the copy-on-write functionality and the location of a shared page in physical memory is determined from the actual PTE. The shared page is modified, for example by modifying the code of the shared page with hooking code, and the copy-on-write attribute in the actual PTE is modified to re-enable the copy-on-write functionality.

In some embodiments, the burden of hooking functions is reduced by preventing the copy-on-write for pages containing code that need to be hooked in the same manner in multiple process address spaces that also load the same pages of code. Further, the burden on address space/backing store is reduced because of the lack of the copy-on-write duplication of pages permitting a more efficient use of memory resources.

Referring again to FIG. 1, hooking application 106 is in computer memory 112. As used herein, a computer memory refers to a volatile memory, a non-volatile memory, or a combination of the two.

Although hooking application 106 is referred to as an application, this is illustrative only. Hooking application 106 should be capable of being called from an application, for example a HIDS application, or the operating system, such as a Windows operating system.

In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for host computer and client-server configurations, embodiments of the present invention may be carried out using any suitable means and/or hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code. Further herein, a means for performing a particular function is accomplished using the appropriate computer-readable code and the related hardware necessary to performing the function.

As illustrated in FIG. 1, this medium may belong to the computer system itself. However, the medium also may be removed from the computer system. For example, hooking application 106 may be stored in memory 136 that is physically located in a location different from processor 108. Processor 108 should be coupled to memory 136. This could be accomplished in a client-server system, or alternatively via a connection to another computer via modems and analog lines, or digital interfaces and a digital carrier line.

More specifically, in one embodiment, host computer system 102A and/or server computer system 130 is a portable computer, a workstation, a two-way pager, a cellular telephone, a digital wireless telephone, a personal digital assistant, a server computer, an Internet appliance, or any other device that includes components that can execute the pregion type determination functionality in accordance with at least one of the embodiments as described herein. Similarly, in another embodiment, host computer system 102A and/or server computer system 130 is comprised of multiple different computers, wireless devices, cellular telephones, digital telephones, two-way pagers, or personal digital assistants, server computers, or any desired combination of these devices that are interconnected to perform, the processes as described herein.

In view of this disclosure, the embodiments of the present invention can be implemented in a wide variety of computer system configurations. In addition, the embodiments of the present invention can be stored as different modules in memories of different devices.

For example, hooking application 106 could initially be stored in server computer system 130, and then as necessary, a portion of hooking application 106 could be transferred to host computer system 102A and executed on host computer system 102A. Consequently, part of hooking application 106 would be executed on processor 132 of server computer system 130, and another part would be executed on processor 108 of host computer system 102A. In view of this disclosure, those of skill in the art can implement various embodiments of the present invention in a wide-variety of physical hardware configurations using an operating system and computer programming language of interest to the user.

In yet another embodiment, hooking application 106 is stored in memory 136 of server computer system 130. Hooking application 106 is transferred over network 124 to memory 112 in host computer system 102A. In this embodiment, network interface 138 and I/O interface 110 would include analog modems, digital modems, or a network interface card. If modems are used, network 124 includes a communications network, and hooking application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
determining a location of a process page table entry;
determining whether said process page table entry is a prototype page table entry;
upon a determination that said process page table entry is said prototype page table entry, determining a location of an actual page table entry from said process page table entry, wherein said determining a location of an actual page table entry from said process page table entry comprises:
reading values of bits 1-7 of said prototype page table entry, said values of said bits 1-7 being low values;
reading values of bits 11-31 of said prototype page table entry, said values of said bits 11-31 being high values; and
ORing together said high values and said low values to generate an offset value, said offset value representing said location of said actual page table entry relative to a base address;
disabling a copy-on-write functionality associated with said actual page table entry;
determining a location of a shared page of memory associated with said actual page table entry;
modifying said shared page; and
enabling said copy-on-write functionality.

2. The method of claim 1, wherein said determining a location of a process page table entry comprises:
locating a page table including said process page table entry; and
looking up said process page table entry in said page table.

3. The method of claim 1, wherein said determining whether said process page table entry is a prototype page table entry comprises:
reading a value of bit 0 of said process page table entry
reading a value of a bit 10 of said process page table entry;
determining whether said value of said bit 0 is zero (0);
determining whether said value of said bit 10 is one (1);
upon a determination that said value of said bit 0 is zero (0) and said value of said bit 10 is one (1), determining said process page table entry is said prototype page table entry; and
otherwise, determining said process page table entry is not said prototype page table entry.

4. The method of claim 1, wherein said base address is 0xE1000000.

5. The method of claim 1, wherein said disabling a copy-on-write functionality associated with said actual page table entry comprises:
modifying a value of bit 9 of said actual page table entry to have a value of zero (0).

6. The method of claim 1, where said enabling said copy-on-write functionality comprises:
modifying a value of a bit 9 of said actual page table entry to have a value of one (1).

7. The method of claim 1, wherein said modifying said shared page comprises:
modifying code present in said shared page.

8. The method of claim 1, wherein said modifying said shared page comprises:
modifying code present in said shared page with hooking code.

9. The method of claim 1, wherein said determining a location of a shared page of memory associated with said actual page table entry comprises:

reading an offset from said actual page table entry, said offset representing said location of said shared page relative to a base address location in physical memory.

10. A method comprising:

locating a page table entry, said page table entry including a copy-on-write attribute enabling a copy-on-write functionality, wherein locating said page table entry comprises:

determining a location of said page table entry from a prototype page table entry, said prototype page table entry including values for bits 1-7 and values for bits 11-31, wherein said values for bits 1-7 are low values and said values for bits 11-31 are high values, and ORing together said high values and said low values to obtain said location of said page table entry;

modifying said copy-on-write attribute to disable said copy-on-write functionality;

modifying code in a shared page associated with said page table entry; and modifying said copy-on-write attribute to re-enable said copy-on-write functionality.

11. The method of claim 10, further comprising:

determining a location of said page table entry utilizing one or more values included in a prototype page table entry.

12. The method of claim 10, further comprising:

determining a location of said shared page utilizing one or more values included in said page table entry.

13. The method of claim 10, wherein said location of said page table entry is an offset relative to a base address.

14. The method of claim 13, wherein said base address is 0xE1000000.

15. A kernel driver including a method for hooking one or more functions on a host computer system, said method comprising:

determining a location of a process page table entry;

determining whether said process page table entry is a prototype page table entry;

upon a determination that said process page table entry is said prototype page table entry, determining a location of an actual page table entry from said process page table entry, wherein said determining a location of an actual page table entry from said process page table entry comprises:

reading values of bits 1-7 of said prototype page table entry, said values of said bits 1-7 being low values;

reading values of bits 11-31 of said prototype page table entry, said values of said bits 11-31 being high values; and ORing together said high values and said low values to generate an offset value, said offset value representing said location of said actual page table entry relative to a base address;

disabling a copy-on-write functionality associated with said actual page table entry;

determining a location of a shared page of memory associated with said actual page table entry;

modifying said shared page; and enabling said copy-on-write functionality.

16. The kernel driver of claim 15, the method further comprising;

registering with an operating system of a host computer system.

17. A computer-program product comprising a computer readable storage medium containing stored computer program code comprising:

means for determining a location of a process page table entry associated with a process;

means for determining whether said process page table entry is a prototype page table entry;

means for determining a location of an actual page table entry from said process page table entry when said process page table entry is said prototype page table entry, wherein said means for determining a location of an actual page table entry from said process page table entry comprises:

means for reading values of bits 1-7 of said prototype page table entry, said values of said bits 1-7 being low values;

means for reading values of bits 11-31 of said prototype page table entry, said values of said bits 11-31 being high values; and means for ORing together said high values and said low values to generate an offset value, said offset value representing said location of said actual page table entry relative to a base address;

means for disabling a copy-on-write functionality associated with said actual page table entry;

means for determining a location of a shared page of memory associated with said actual page table entry;

means for modifying said shared page; and means for enabling said copy-on-write functionality.

* * * * *

UNITED STATES PATENT AND TRADEMARK OFFICE
CERTIFICATE OF CORRECTION

PATENT NO. : 7,296,138 B1
APPLICATION NO. : 11/075515
DATED : November 13, 2007
INVENTOR(S) : Conover et al.

Page 1 of 1

It is certified that error appears in the above-identified patent and that said Letters Patent is hereby corrected as shown below:

On The Title Page, at Item 57, at line 3, following "PTE is", and prior to "prototype PTE", insert --a--; at line 6, following "location of" and prior to "shared", insert --a--.
In Column 10, Line 36, Claim 3, following "entry", insert --;--.
In Column 12, Line 12, Claim 16, following "comprising", replace ";" with --:--.

Signed and Sealed this

First Day of April, 2008

JON W. DUDAS
*Director of the United States Patent and Trademark Office*